Patented Feb. 8, 1927.

1,617,237

UNITED STATES PATENT OFFICE.

JOSEPH G. DAVIDSON, OF YONKERS, NEW YORK, ASSIGNOR TO CARBIDE AND CARBON CHEMICALS CORPORATION, A CORPORATION OF NEW YORK.

CELLULOSE-ESTER COMPOSITION.

No Drawing.    Application filed May 10, 1926. Serial No. 108,171.

This invention relates to improvements in cellulose ester compositions and in particular to an improved plasticizer for cellulose ester compositions of the type known as celluloid or pyralin. Camphor has been used for many years in the manufacture of plastics containing quantities of cellulose esters but the characteristic odor of camphor and its relatively high cost make desirable the use of a substitute for at least a part of the camphor. An object of my invention is the provision of such a substitute for camphor. Other objects of my invention will be evident from the following specification.

Pyroxylin plastics are generally formed by treating nitrocellulose with camphor and a suitable solvent. A typical formula for this process is as follows:

100 parts nitrocellulose.
10 to 20 parts "medium boiler."
10 to 30 parts camphor.
Sufficient acetone to make up a mix of desired plasticity.

The "medium boiler" referred to above is generally a mixture of butyl and amyl acetates, but may be of various other compositions well known to those skilled in the art.

I have found that bibenzyl may be substituted in whole or a part for the camphor of the above formula. Bibenzyl is a white solid, melting at 51.8° C. and boiling at 248° C. and has the formula:

$$C_6H_5-CH_2-CH_2-C_6H_5$$

While it is not a very strong solvent for nitrocellulose by itself, when mixed with alcohol it becomes a good solvent. When mixed with solution of nitrocellulose in acetone or other solvents it does not precipitate the cellulose ester out of the solution. I have found that by substituting bibenzyl for camphor, in whole or in part, in the above or other well known formulas for pyroxylin plastics a product is formed which is in no way inferior to that produced when using camphor and which is superior in freedom from odor and other respects and which can be produced at a lower cost.

While I have given a typical formula, I do not limit myself to such formula as it is evident to those skilled in the art that other formulas may be employed.

What I claim is:

1. A pyroxylin plastic containing bibenzyl as a plasticizer.

2. A composition of matter containing nitrocellulose, a solvent and bibenzyl.

3. A composition of matter containing 100 parts of nitrocellulose, 10 to 20 parts of a solvent and 10 to 30 parts of a plasticizer including a substantial amount of bibenzyl.

4. A composition of matter containing nitrocellulose, esters of the higher alcohols, a plasticizer including a substantial amount of bibenzyl, and a diluent.

5. A composition of matter containing 100 parts of nitrocellulose, from 10 to 20 parts "medium boiler", from 10 to 30 parts of a plasticizer including a substantial proportion of bibenzyl, and acetone.

6. A composition of matter including 100 parts of nitrocellulose, from 10 to 20 parts of esters of the higher alcohols, from 10 to 30 parts of bibenzyl and sufficient acetone to give the desired plasticity.

7. The method of making pyroxylin plastics which includes the step of treating nitrocellulose with a solvent and a plasticizer containing a substantial proportion of bibenzyl.

8. The method of making pyroxylin plastics which includes the steps of treating nitrocellulose with a solvent and a plasticizer containing a substantial proportion of bibenzyl and thinning the product to the desired consistency.

9. The method claimed in claim 8 in which the solvent is an ester of the higher alcohols.

In testimony whereof, I affix my signature.

JOSEPH G. DAVIDSON